United States Patent
Barber et al.

(10) Patent No.: US 10,769,180 B2
(45) Date of Patent: Sep. 8, 2020

(54) EFFICIENT DATAFLOW PROCESSING FOR OBJECTS

(71) Applicant: INTERNATIONAL BUSINESS MACHINES CORPORATION, Armonk, NY (US)

(72) Inventors: Ronald J. Barber, San Jose, CA (US); Rene Mueller, San Jose, CA (US); Vijayshankar Raman, Sunnyvale, CA (US); Richard S. Sidle, Ottawa (CA); Pinar Tozun, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 15/423,523

(22) Filed: Feb. 2, 2017

(65) Prior Publication Data

US 2018/0217899 A1    Aug. 2, 2018

(51) Int. Cl.
| | | |
|---|---|---|
| *G06F 16/28* | (2019.01) | |
| *G06F 16/23* | (2019.01) | |
| *G06F 11/14* | (2006.01) | |
| *G06F 9/46* | (2006.01) | |
| *G06F 9/448* | (2018.01) | |
| *G06F 9/455* | (2018.01) | |
| *G06F 9/451* | (2018.01) | |
| *G06F 8/41* | (2018.01) | |

(52) U.S. Cl.
CPC .......... *G06F 16/289* (2019.01); *G06F 9/4488* (2018.02); *G06F 9/451* (2018.02); *G06F 9/45508* (2013.01); *G06F 9/46* (2013.01); *G06F 11/14* (2013.01); *G06F 16/235* (2019.01); *G06F 16/288* (2019.01); *G06F 8/41* (2013.01); *G06F 2201/80* (2013.01)

(58) Field of Classification Search
CPC ... G06F 11/1471; G06F 11/1474; G06F 16/27
USPC .......................................... 707/643
See application file for complete search history.

(56) References Cited

U.S. PATENT DOCUMENTS

| | | | |
|---|---|---|---|
| 7,020,697 B1* | 3/2006 | Goodman | G06Q 10/10 709/223 |
| 7,401,324 B1* | 7/2008 | Dmitriev | G06F 8/443 717/130 |
| 8,429,631 B2 | 4/2013 | Schumacher et al. | |
| 8,959,499 B2 | 2/2015 | Chambers et al. | |
| 2004/0167945 A1* | 8/2004 | Garthwaite | G06F 12/0253 |
| 2005/0182758 A1* | 8/2005 | Seitz | G06F 9/5016 |
| 2005/0273773 A1* | 12/2005 | Gold | G06F 8/34 717/139 |
| 2006/0218123 A1* | 9/2006 | Chowdhuri | G06F 16/24532 |
| 2008/0134138 A1* | 6/2008 | Chamieh | G06F 9/45508 717/105 |
| 2010/0131916 A1* | 5/2010 | Prigge | G06F 8/10 717/104 |

(Continued)

*Primary Examiner* — Tamara T Kyle
*Assistant Examiner* — Raheem Hoffler
(74) *Attorney, Agent, or Firm* — Sherman IP LLP; Kenneth L. Sherman; Steven Laut

(57) ABSTRACT

One embodiment provides a method comprising adjusting a runtime of a dataflow processing environment to operate on multiple batches of objects. The method further comprises pre-allocating one or more vectors of objects, and processing the multiple batches one at a time. The one or more vectors of objects are re-used during processing of each batch.

20 Claims, 10 Drawing Sheets

(56) References Cited

U.S. PATENT DOCUMENTS

| | | | |
|---|---|---|---|
| 2010/0199257 A1* | 8/2010 | Biggerstaff | G06F 8/456 |
| | | | 717/104 |
| 2013/0031560 A1* | 1/2013 | Gargash | G06F 11/3013 |
| | | | 718/104 |
| 2015/0160637 A1* | 6/2015 | Lloyd | G05B 19/0426 |
| | | | 700/17 |
| 2016/0103898 A1 | 4/2016 | Zheng et al. | |
| 2016/0291942 A1* | 10/2016 | Hutchison | G06F 8/451 |

* cited by examiner

EFFICIENT DATAFLOW PROCESSING FOR OBJECTS

The present invention generally relates to dataflow processing systems, and more particularly, to a system and method for processing large volumes of complex objects.

BACKGROUND

Object-oriented applications written in object-oriented programming languages (e.g., Java, Scala, etc.) may involve processing of large volumes of structured or semi-structured data as objects in distributed parallel dataflow processing environments (e.g., Hadoop (MapReduce) or Spark). Input data may be stored (e.g., in a distributed filesystem such as Hadoop Distributed File System (HDFS)) or streamed. Often the objects are complex in nature. For example, an object may be an instance of a class that is deeply nested (i.e., containing other classes or variable-size arrays of other classes; this may be repeated at multiple levels of nesting, for example, with arrays of arrays, etc). Furthermore, polymorphism, a powerful feature of object-oriented programming languages that enables multiple related types of objects to be represented by and processed as instances of a single class, may apply to any class, at any level of nesting.

SUMMARY

One embodiment provides a method comprising adjusting a runtime of a dataflow processing environment to operate on multiple batches of objects. The method further comprises pre-allocating one or more vectors of objects, and processing the multiple batches one at a time. The one or more vectors of objects are re-used during processing of each batch.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to dataflow processing systems, and more particularly, to a system and method for processing large volumes of complex objects. One embodiment provides a method comprising adjusting a runtime of a dataflow processing environment to operate on multiple batches of objects. The method further comprises pre-allocating one or more vectors of objects, and processing the multiple batches one at a time. The one or more vectors of objects are re-used during processing of each batch.

Conventionally, an object is processed in the following manner: (1) the object is materialized in memory via a series of memory allocations and constructor function calls, (2) a required function is applied to the object, and (3) the object is destroyed via a series of destructor function calls and memory deallocation (i.e., memory free) operations. If processing a complex object, multiple memory allocations and memory deallocations are required for each level of nesting in a class that the complex object is an instance of. This increases pressure on memory heap implementation and garbage collection, resulting in a performance bottleneck that limits overall system performance. Further, polymorphism may add to an overhead of virtual function calls per object.

A conventional solution utilized by object-oriented applications to reduce memory allocations and memory fragmentation is using typed heaps with built-in sub-allocation. Typed heaps alone, however, do not resolve challenges that may arise from processing large volumes of complex objects.

Figure 1:
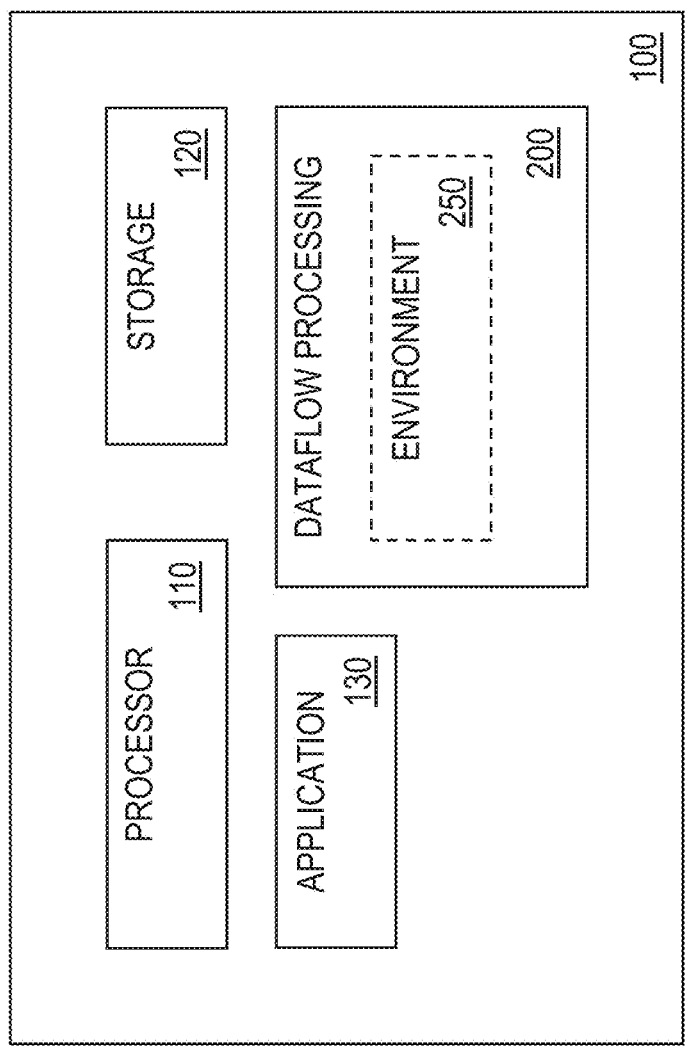
FIG. 1 illustrates an example computer architecture for dataflow processing, in accordance with an embodiment of the invention.

FIG. 1 illustrates an example computer architecture 100 for dataflow processing, in accordance with an embodiment of the invention. The computer architecture 100 comprises one or more processor devices 110 and one or more storage devices 120. One or more object-oriented applications 130 may execute/operate on the processor devices 110. As described in detail later herein, the computer architecture 100 further comprises a dataflow processing system 200 that utilizes the processor devices 110 and/or the storage devices 120 to provide, during runtime of the object-oriented applications 130, a distributed parallel dataflow processing environment 250 for processing objects included in the object-oriented applications 130. As described in detail later herein, the dataflow processing system 200 facilitates processing of large volumes of complex objects.

Figure 2A:
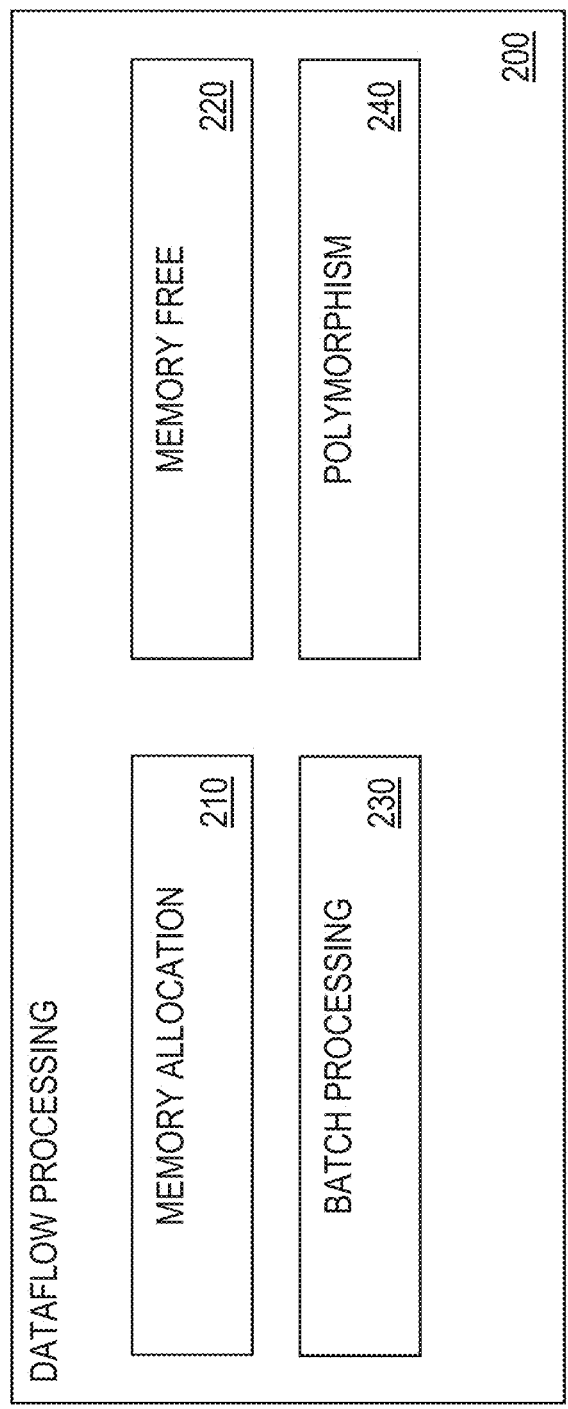
FIG. 2A illustrates an example dataflow processing system in detail, in accordance with an embodiment of the invention.

FIG. 2A illustrates an example dataflow processing system 200 in detail, in accordance with an embodiment of the invention. In one embodiment, the dataflow processing system 200 comprises at least one of the following components: (1) a memory allocation unit 210 configured to control memory allocations and constructor function calls, (2) a memory free unit 220 configured to control memory deallocations and deconstructor function calls, (3) a batch processing unit 230 configured to process one or more batches of objects and reuse, during the processing, one or more allocated objects to reduce or eliminate memory allocations and garbage collection as a performance bottleneck, and (4) a polymorphism unit 240 configured to reduce or eliminate virtual function calls in the presence of polymorphism.

Figure 2B:
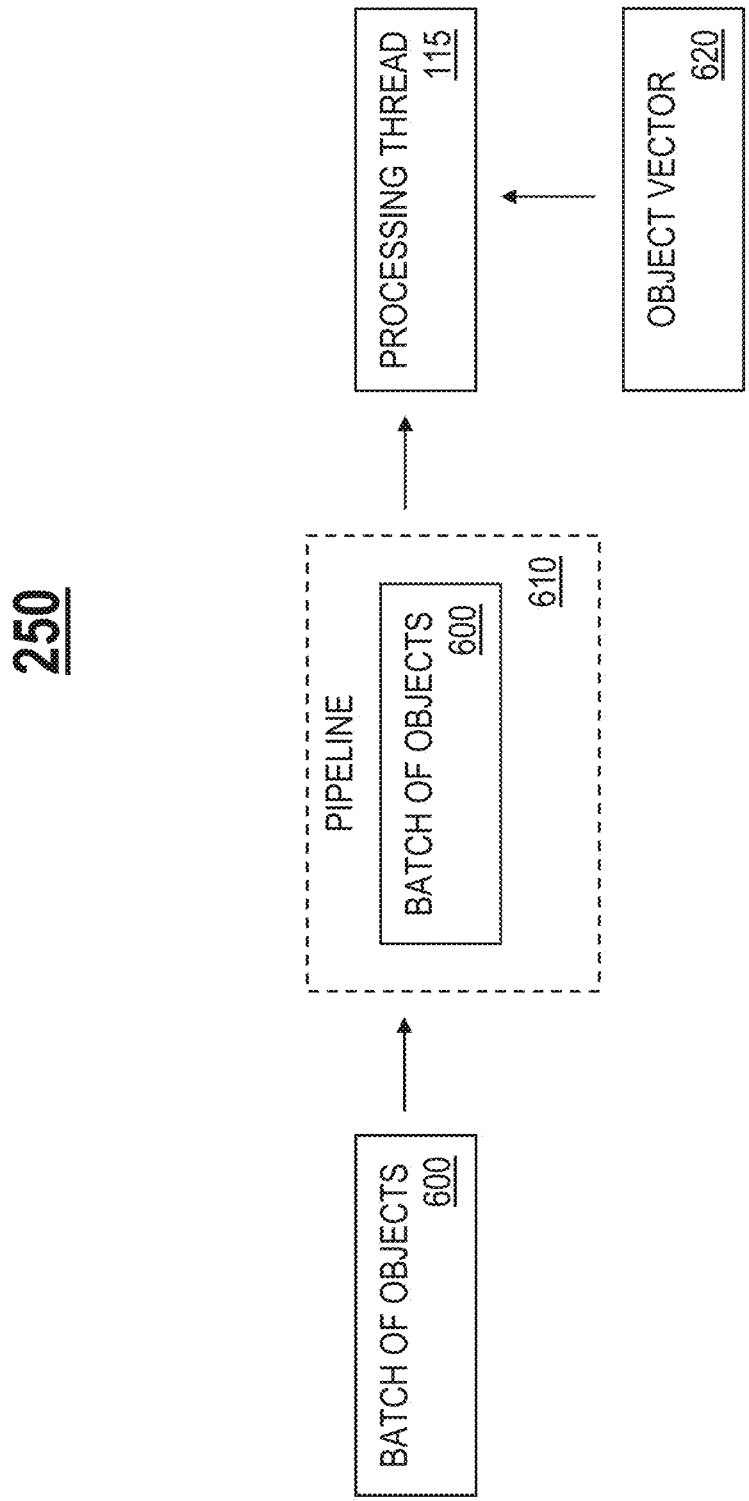
FIG. 2B illustrates an example batch-based dataflow processing environment, in accordance with an embodiment of the invention.

FIG. 2B illustrates an example batch-based dataflow processing environment 250, in accordance with an embodiment of the invention. The batch processing unit 230 is configured to change a runtime of the dataflow processing environment 250 to operate on one or more batches 600 of objects (i.e., a batch-based dataflow processing environment). At least one processing thread 115 may run on the processor devices 110 to process the batches 600.

Before processing the batches 600, the batch processing unit 230 triggers the memory allocation unit 210 to pre-allocate one or more vectors 620 of objects ("object vectors"). In one embodiment, a processing thread 115 is assigned one or more of the pre-allocated object vectors 620 for use in processing one or more batches 600 assigned to the processing thread 115. The object vectors 620 assigned to the processing thread 115 may be reused repeatedly during processing of each assigned batch 600. Specifically, the processing thread 115 processes each assigned batch 600 one at a time, thereby facilitating reuse of the assigned object vectors 620 from one batch 600 to another batch 600 (i.e., the processing thread 115 completes/finishes processing one batch 600 before another batch 600 enters a pipeline 610 of the processing thread 115 for processing).

In one embodiment, to enable object reuse in the dataflow processing environment 250, the batch processing unit 230 is configured to construct one or more new data structures for commonly used object types and data types such as arrays and strings. The new data structures facilitate object reuse at all levels of nesting in a class that a complex object is an instance of.

For example, assume a first class comprising an array of a second class ("array of nested classes"). The first class is an outer class relative to the nested classes, and each nested class is an inner class relative to the first class. The batch processing unit 230 triggers the memory allocation unit 210 to pre-allocate a first object vector 620 for the first class, wherein a size of the first object vector 620 is fixed and known. In one embodiment, the size of the first object vector 620 may be an upper bound on a size of a batch 600 ("batch size"). For each nested class, an appropriate size for an object vector 620 that is pre-allocated for the nested class is unknown prior to processing. Therefore, to accommodate the array of nested classes, an extendible object vector 620 is pre-allocated for the nested classes. The extendible object vector 620 may be implemented utilizing different extendible vector implementations, such as a deque, etc. The extendible object vector 620 is pre-allocated with an initial size/capacity (e.g., batch size) and then grows as needed to accommodate cumulative array sizes for a batch 600. For example, if a later/subsequent batch 600 for processing has more content than will fit in a currently allocated size of an object vector 620, the size of the object vector 620 is extended such that the object vector 620 can hold content of the later/subsequent batch 600.

Figure 3:
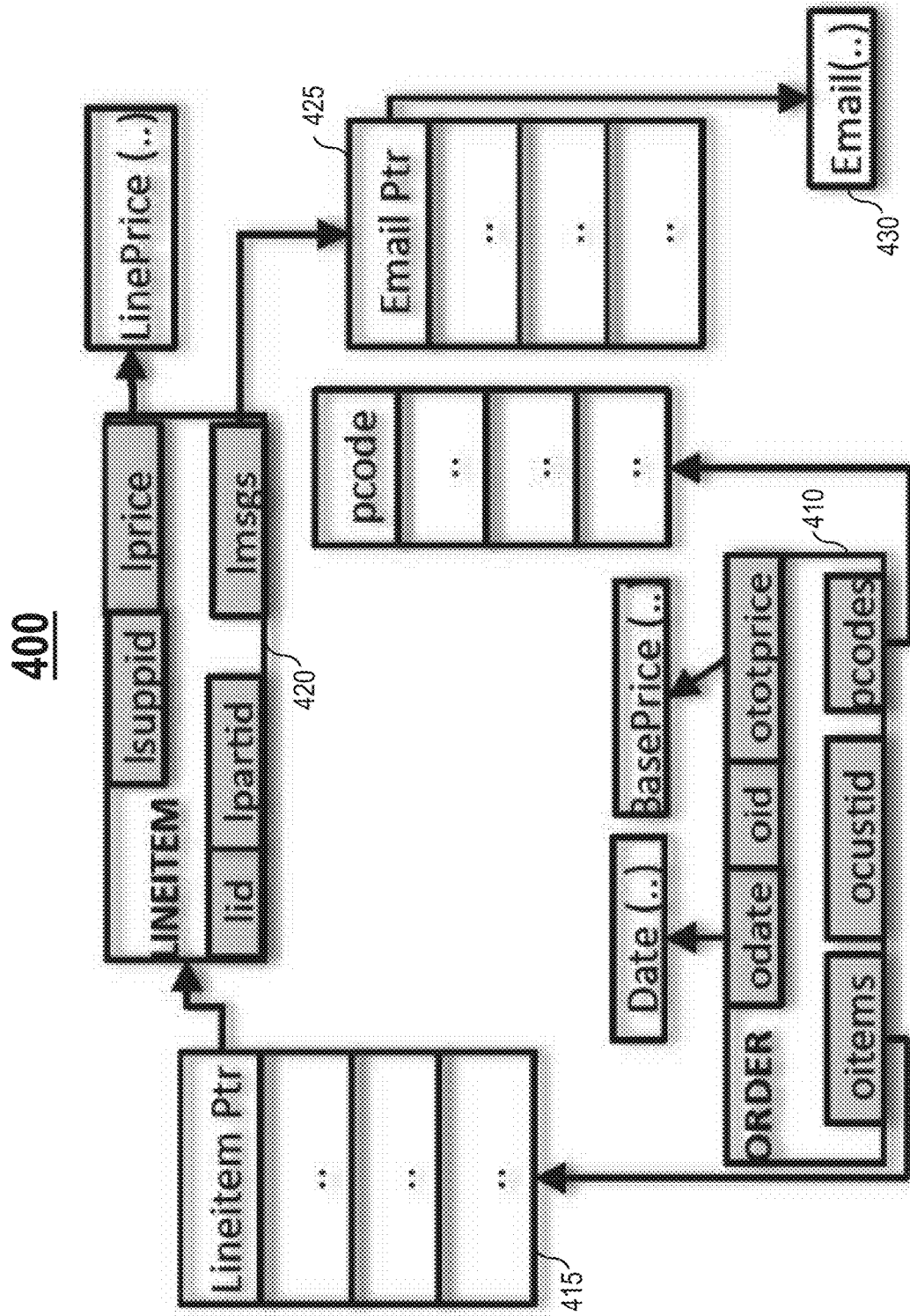
FIG. 3 illustrates an example class (i.e., composition) hierarchy for a class that a complex object is an instance of, in accordance with an embodiment of the invention.

FIG. 3 illustrates an example class (i.e., composition) hierarchy 400 for a class that a complex object is an instance of, in accordance with an embodiment of the invention. An ORDER object 410 is an instance of an ORDER class with multiple levels of nesting (i.e., deeply nested). The ORDER object 410 comprises an array field oitems. The array field oitems is an object holding an array 415 of cursors (Lineitem Ptr), wherein each cursor references a LINEITEM object 420.

As shown in FIG. 3, each LINEITEM object 420 comprises an array field Imsgs. The array field Imsgs is an object holding an array 425 of cursors (Email Ptr), wherein each cursor references an EMAIL object 430.

Array fields may have varying numbers of instances. For example, a current ORDER object 410 may have an array often (10) LINEITEM objects 420, whereas a next ORDER object 410 may have an array of twenty (20) LINEITEM objects 420. To accommodate array fields that have varying numbers of instances, the dataflow processing system 200 allocates all nested objects from class-specific pools of fixed-width entities (even arbitrarily nested objects with repeating groups). The dataflow processing system 200 analyzes the class whose objects are being scanned to identify an underlying class hierarchy. This analysis may be performed through reflection or any other means.

Let ObjStream denote an example extendible object vector 420. An ObjStream object comprises a cursor and an extendible (i.e., growable) array of fixed-width objects. The cursor is used to record current locations in the ObjStream object of a next free entry that is available to be used while processing a next tuple of the batch. For each class of the class hierarchy 400, the dataflow processing system 200 pre-allocates a corresponding ObjStream object for the class. In one embodiment, the dataflow processing system 200 constructs ObjStream<X>, wherein the ObjStream<X> comprises a linked list of arrays of pointers to objects of type X.

A processing thread 115 is assigned one or more corresponding ObjStream objects for use in processing one or more batches 600 assigned to the processing thread 115. At the start of processing a batch 600, a cursor of a corresponding ObjStream object is reset to a start/initial position of the ObjStream object. For each tuple encountered in the batch 600, an operator is invoked to reserve the total number of objects required from the corresponding ObjStream object, and the cursor is advanced. If the cursor reaches an initial size/capacity allocated for the corresponding ObjStream object, the ObjStream object is re-sized/extended by adding one or more arrays to the underlying linked list. Objects of the ObjStream may be reused via any method of in-place object construction that is supported by a programming language. For example, using the "placement new" facility in C++, and using a "setter" method for each field of an object in Java.

Let OX_Array denote a data structure having an interface of an array but implemented as a sub-range of an ObjStream object (i.e., has a start, end, and a reference to the ObjStream object). An OX_Array represents an overlay on an object vector having a fixed/known size (e.g., batch size). An array field may be declared as an OX_Array, such that each member of the array field has an (start, end) pair that refers to entries of an object vector having a fixed/known size. For example, if a first ORDER object 410 of the array field oitems comprises an array of three (3) LINEITEM objects 420, the first ORDER object 410 has an (start, end) pair that is (0, 2) (i.e., an offset of 0 as the first member, and a length of 3, thus comprising of the entries with indexes 0, 1, and 2). If a second ORDER object 410 of the array field oitems comprises an array of three (3) LINEITEM objects 420, the second ORDER object 410 has an (start, end) pair that is (3, 5) (i.e., an offset of 3, and a length of 3). An OX_Array is allocated once and reused for each batch by updating (start, end) pairs.

Figure 4A:
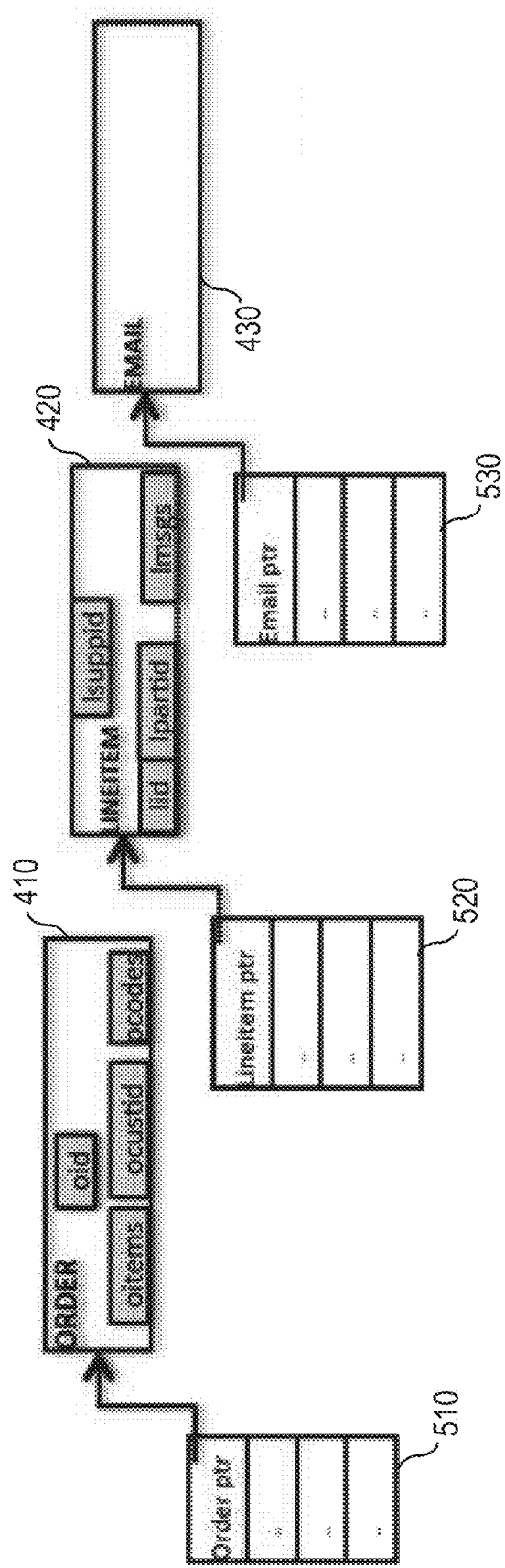
FIG. 4A illustrates an initial state of object vectors pre-allocated for the class hierarchy in FIG. 3, in accordance with an embodiment of the invention.

FIG. 4A illustrates an initial state of object vectors pre-allocated for the class hierarchy 400 in FIG. 3, in accordance with an embodiment of the invention. If a conventional dataflow processing system scans the class hierarchy 400, an ORDER object 410 is materialized in memory via multiple memory allocations and constructor function calls, and the ORDER object 410 is destroyed via multiple destructor function calls and memory deallocation operations.

By comparison, in one embodiment, the dataflow processing system 200 scans the class hierarchy 400 to determine a set of object vectors 620 to allocate with one object vector 620 per class. The allocated object vectors 620 are used as a common location to place objects during processing of each batch 600, and content at each level of nesting is placed in a vector allocated for a corresponding class in the class hierarchy 400. The dataflow processing system 200 pre-allocates the following ObjStream objects for a processing thread 115 assigned one or more batches 600 of ORDER objects 410 for processing: (1) a first object vector 510 for ORDER objects 410, (2) a second object vector 520 for LINEITEM objects 420, and (3) a third object vector 530 for EMAIL objects 430. The first object vector 510 is an object holding an array of pointers (Order ptr), wherein each pointer references an ORDER object 410. A size of the first object vector 510 is fixed and known (e.g., batch size). The second object vector 520 is an object holding an array of pointers (Lineitem ptr), wherein each pointer references a LINEITEM object 420. The second object vector 520 is extendible; the second object vector 520 may also have an initial size/capacity equal to the batch size and will be extended to accommodate all LINEITEM objects 420 for a batch of ORDER objects 410. For example, if an average size of the array field oitems is 4, the size of the second object vector 520 may grow until it reaches about 4 times a size of the first object vector 510 (e.g., 4 times the batch size). The third object vector 530 is an object holding an array of pointers (Email ptr), wherein each pointer references an EMAIL object 430. The third object vector 530 is extendible; the third object vector 530 grows up to at least a maximum number of EMAIL objects 430 for all LINEITEM objects 420 of all ORDER objects 410 of a batch, taken over all batches.

Figure 4B:
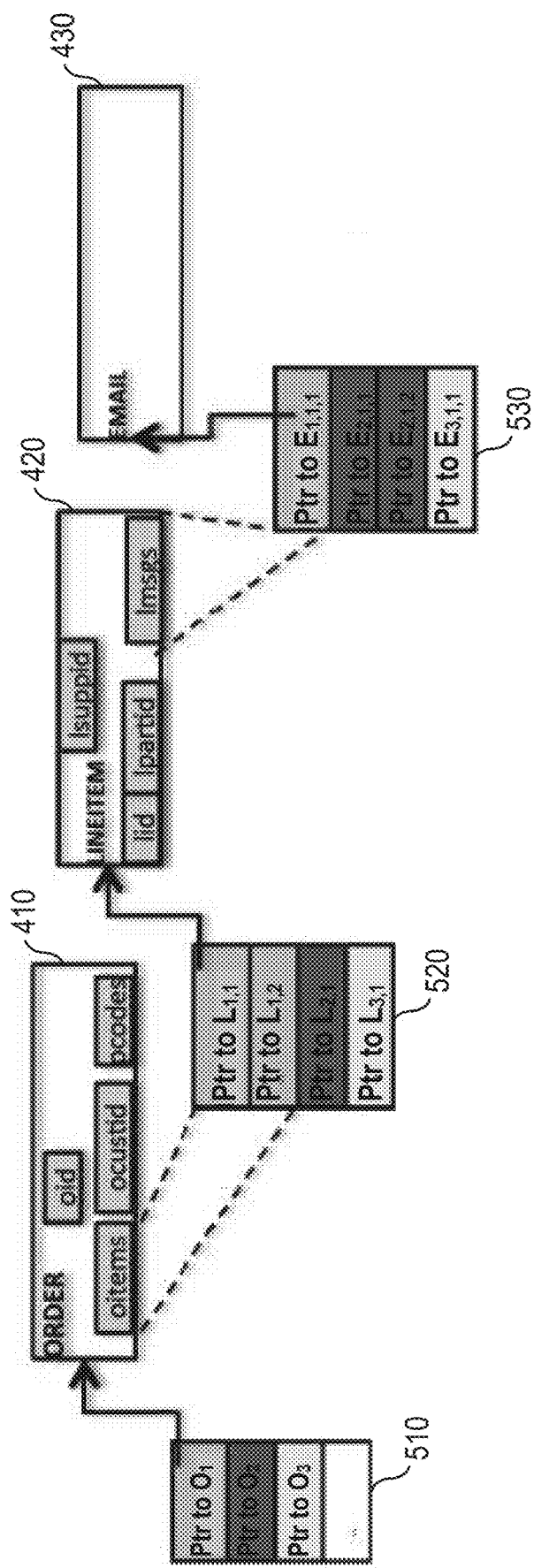
FIG. 4B illustrates the state of object vectors pre-allocated for the class hierarchy after processing a first batch of objects, in accordance with an embodiment of the invention.

FIG. 4B illustrates the state of object vectors pre-allocated for the class hierarchy 400 after processing a first batch of objects, in accordance with an embodiment of the invention. Assume a pipeline 610 for a processing thread 115 assigned the object vectors 510, 520, and 530 comprises a first batch 600 of three ORDER objects $O_1$, $O_2$, and $O_3$. As shown in FIG. 4B, the first object vector 510 comprises a first pointer to ORDER object $O_1$, a second pointer to ORDER object $O_2$, and a third pointer to ORDER object $O_3$.

Assume ORDER object $O_1$ comprises an array field oitems of size 2 (i.e., comprises two LINEITEM objects $L_{1,1}$ and $L_{1,2}$), ORDER object $O_2$ comprises an array field oitems of size 1 (i.e., comprises one LINEITEM objects $L_{2,1}$), and ORDER object $O_3$ comprises an array field oitems of size 1 (i.e., comprises one LINEITEM object $L_{3,1}$). As shown in FIG. 4B, the second object vector 520 comprises a first pointer to LINEITEM object $L_{1,1}$, a second pointer to LINEITEM object $L_{1,2}$, a third pointer to LINEITEM object $L_{2,1}$, and a fourth pointer to LINEITEM object $L_{3,1}$.

Assume LINEITEM object $L_{1,1}$ comprises an array field lmsgs of size 1 (i.e., comprises one EMAIL object $E_{1,1,1}$), LINEITEM object $L_{1,2}$ comprises an array field lmsgs of size 0 (i.e., no EMAIL objects), LINEITEM object $L_{2,1}$ comprises an array field lmsgs of size 2 (i.e., comprises two EMAIL objects $E_{2,1,1}$ and $E_{2,1,2}$), and LINEITEM object $L_{3,1}$ comprises an array field lmsgs of size 1 (i.e., comprises one EMAIL object $E_{3,1,1}$). As shown in FIG. 4B, the third object vector 530 comprises a first pointer to EMAIL object $E_{1,1,1}$, a second pointer to EMAIL object $E_{2,1,1}$, a third pointer to EMAIL object $E_{2,1,2}$, and a fourth pointer to EMAIL object $E_{3,1,1}$.

Figure 4C:
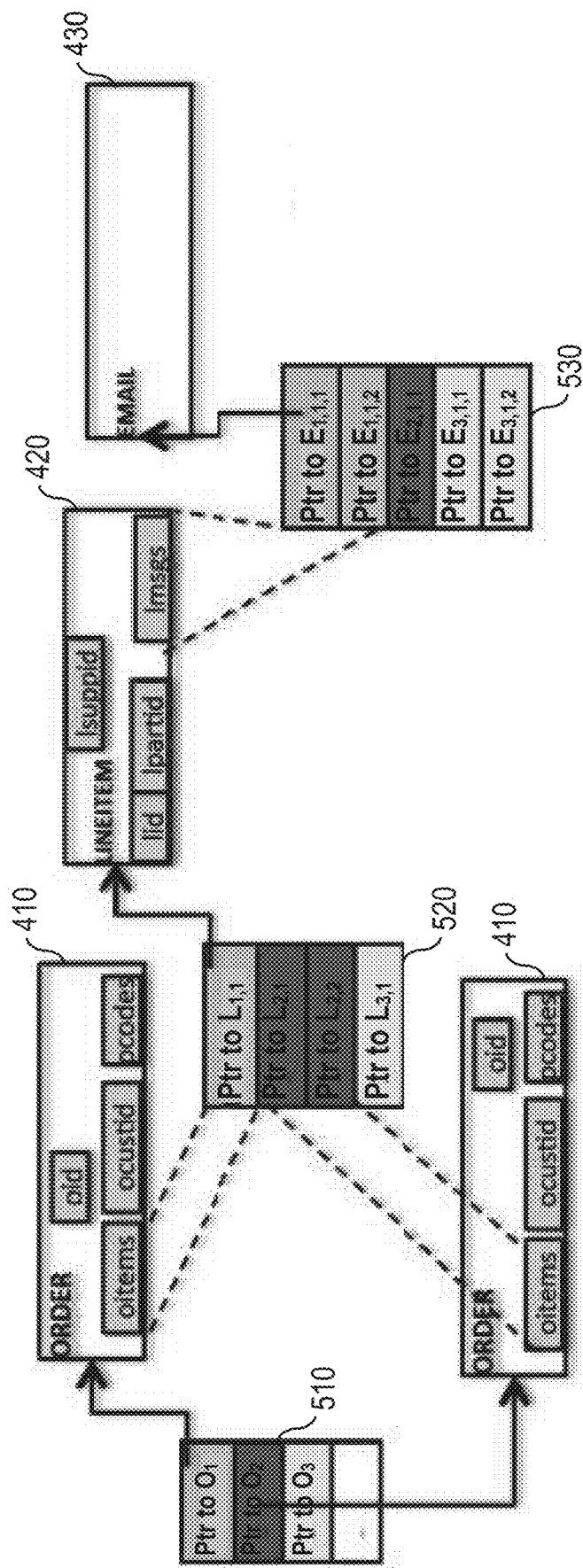
FIG. 4C illustrates the state of object vectors pre-allocated for the class hierarchy after processing a second batch of objects, in accordance with an embodiment of the invention.

FIG. 4C illustrates the state of object vectors pre-allocated for the class hierarchy 400 after processing a second batch of objects, in accordance with an embodiment of the invention. After the processing thread 115 completes/finishes processing the first batch 600, a second batch 600 is inserted into the pipeline 610 for the processing thread 115 to process next. Assume the second batch 600 also comprises three ORDER objects $O_1$, $O_2$, and $O_3$. As shown in FIG. 4C, the first object vector 510 is re-used, comprising cursors to ORDER objects $O_1$, $O_2$, and $O_3$.

Assume ORDER object $O_1$ comprises an array field oitems of size 1 (i.e., comprises one LINEITEM object $L_{1,1}$), ORDER object $O_2$ comprises an array field oitems of size 2 (i.e., comprises two LINEITEM objects $L_{2,1}$ and $L_{2,2}$), and ORDER object $O_3$ comprises an array field oitems of size 1 (i.e., comprises one LINEITEM object $L_{3,1}$). As shown in FIG. 4B, the second object vector 520 is re-used, comprising cursors to LINEITEM objects $L_{1,1}$, $L_{2,1}$, $L_{2,2}$, and $L_{3,1}$.

Assume LINEITEM object $L_{1,1}$ comprises an array field lmsgs of size 2 (i.e., comprises two EMAIL objects $E_{1,1,1}$ and $E_{1,1,2}$), LINEITEM object $L_{2,1}$ comprises an array field lmsgs of size 0 (i.e., no EMAIL objects), LINEITEM object $L_{2,2}$ comprises an array field lmsgs of size 1 (i.e., comprises one EMAIL object $E_{2,1,1}$), and LINEITEM object $L_{3,1}$ comprises an array field lmsgs of size 2 (i.e., comprises two EMAIL objects $E_{3,1,1}$ and $E_{3,1,2}$). Unlike the first batch 600, the second batch 600 requires five EMAIL objects in total (i.e., $E_{1,1,1}$, $E_{1,1,2}$, $E_{2,1,1}$, $E_{3,1,1}$, $E_{3,1,2}$). As shown in FIG. 4C, the third object vector 530 is re-sized/extended to accommodate cursors to EMAIL objects $E_{1,1,1}$, $E_{1,1,2}$, $E_{2,1,1}$, $E_{3,1,1}$, $E_{3,1,2}$.

Therefore, unlike a conventional dataflow processing system, the object vectors 510, 520, and 520 are re-used during the processing of the second batch 600; no new object vectors are allocated for each batch 600 processed.

Strings are a common and important data type in multiple object-oriented applications. In object-oriented languages such as Java, a string is implemented as a complex object with a nested structure. In one embodiment, the dataflow processing system 200 implements a string nested in an object using a serialized format (e.g., a char array) in which all strings of a batch 600 are concatenated together into a growable array. For example, the growable array may be an ObjStream of type bytes (e.g., ObjStream<bytes>550 in FIG. 4D) and each string of the batch 600 is implemented as (a) a start position in the ObjStream, (b) an end position in the ObjStream, and (c) any additional metadata information that is specific to the string type, such as an encoding scheme used for individual characters of the string.

Let OX_String denote an example string type implementation.

Figure 4D:
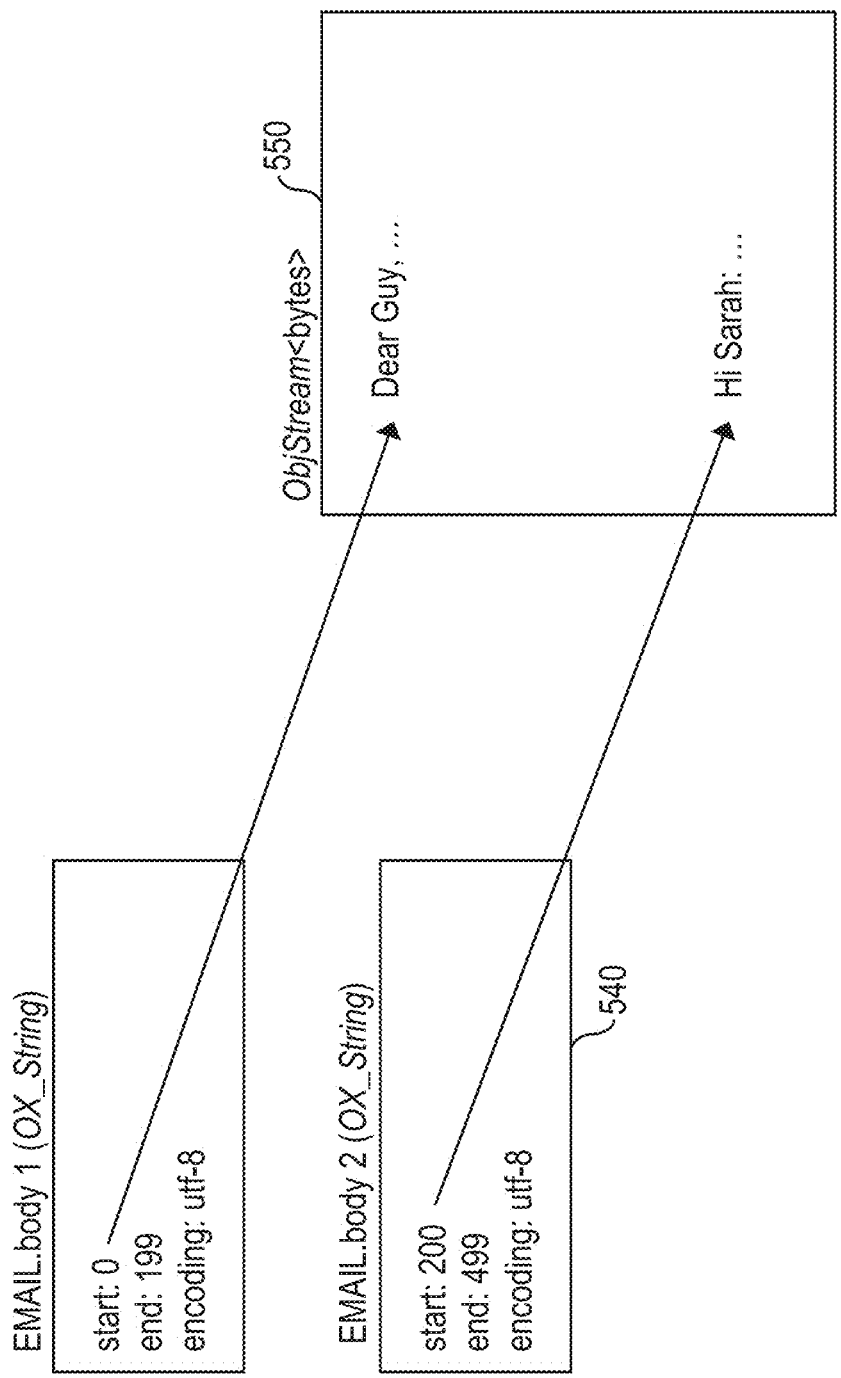
FIG. 4D illustrates two instances of an example string type implementation, in accordance with an embodiment of the invention.

FIG. 4D illustrates two instances of an example string type implementation OX_String, in accordance with an embodiment of the invention. Each OX_String object 540 may be located in a body section of an EMAIL object 430. If permitted by a programming language, OX_String may be added as a sub-type of a built-in string type of the programming language or the programmer may replace use of the built-in string type with OX_String.

For a polymorphic object comprising multiple distinct sub-types, the polymorphism unit 240 triggers the memory allocation unit 210 to pre-allocate, for each distinct sub-type, a corresponding object vector 620. Processing of a polymorphic object is performed per each distinct sub-type.

Assume a processing thread 115 is assigned a batch 600 of ORDER objects 410 for processing, wherein each ORDER object 410 is one of the following two distinct sub-types: (1) an InStoreOrder object, or (2) a WebOrder object. If a function to be applied to the batch 600 does not require the ORDER objects 410 to be processed in a specific order, the polymorphism unit 240 triggers the memory allocation unit 210 to pre-allocate, for each distinct sub-type, a corresponding object vector 620. Specifically, the following two separate object vectors 620 are pre-allocated: (1) a first object vector 620 for InStoreOrder objects, and (2) a second object vector 620 for WebOrder objects. Further, the polymorphism unit 240 triggers the memory allocation unit 210 to pre-allocate a vector of indicators ("indicator vector"). Each indicator of the indicator vector corresponds to an ORDER object 410 of the batch 600, and comprises information indicative of a sub-type of the corresponding ORDER object 410 (i.e., whether the corresponding ORDER object 410 is an InStoreOrder object or a WebOrder object). For each distinct sub-type, the batch processing unit 230 applies batch processing independently to an object vector 620 pre-allocated for the distinct sub-type (i.e., the first object vector 620 for InStoreOrder objects is processed independently from the second object vector 620 for WebOrder objects), thereby avoiding virtual function calls. In one embodiment, a single processing thread is assigned for the separate object vectors, wherein the single processing thread processes the separate objects vectors sequentially. In another embodiment, multiple processing threads are assigned for the separate object vectors, wherein the multiple processing threads process the separate object vectors in parallel. Results from each object vector 620 processed are subsequently combined.

If the function to be applied to the batch 600 requires the ORDER objects to be processed in a specific order (e.g., a window Online Analytical Processing (OLAP) function), processing need not be separated for each distinct sub-type. As processing need not be separated for each distinct sub-type, the polymorphism unit 240 triggers the memory allocation unit 210 to pre-allocate a single object vector 620 for ORDER objects 410. The batch processing unit 230 applies batch processing to the single object vector 620, wherein one or more virtual function calls may be invoked.

The techniques described above may be applied to any arbitrarily nested objects and may also be applied to transformations on such arbitrary nested objects.

Figure 5:
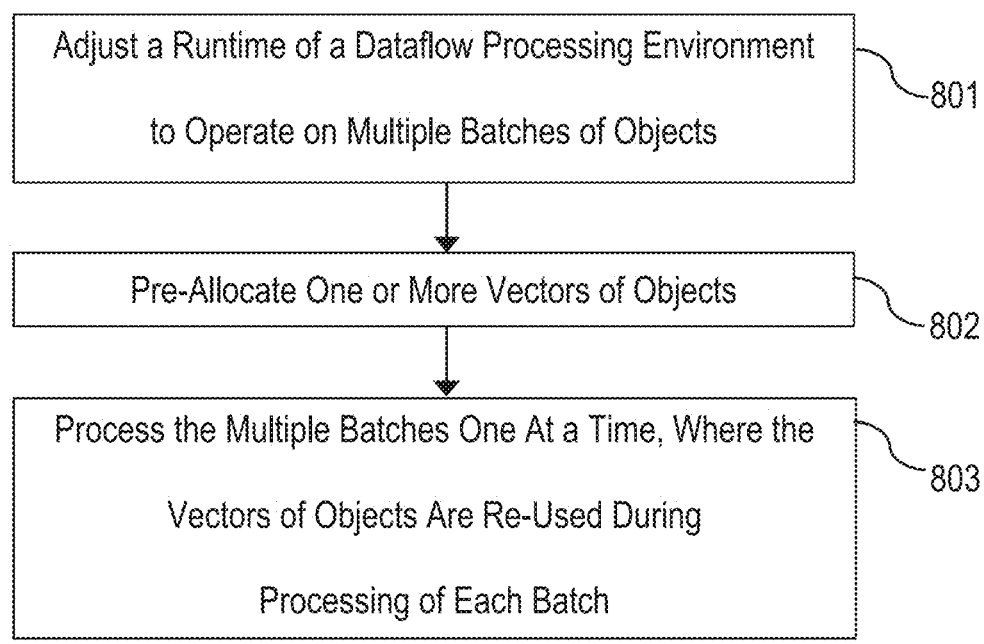
FIG. 5 illustrates a flowchart of an example process for dataflow processing, in accordance with an embodiment of the invention.

FIG. 5 illustrates a flowchart of an example process 800 for dataflow processing, in accordance with an embodiment of the invention. In process block 801, adjust a runtime of a dataflow processing environment to operate on multiple batches of objects. In process block 802, pre-allocate one or more vectors of objects. In process block 803, process the multiple batches one at a time, where the vectors of objects are re-used during processing of each batch.

In one embodiment, process blocks 801-803 may be performed by the dataflow processing system 200 utilizing the processor devices 110.

Figure 6:
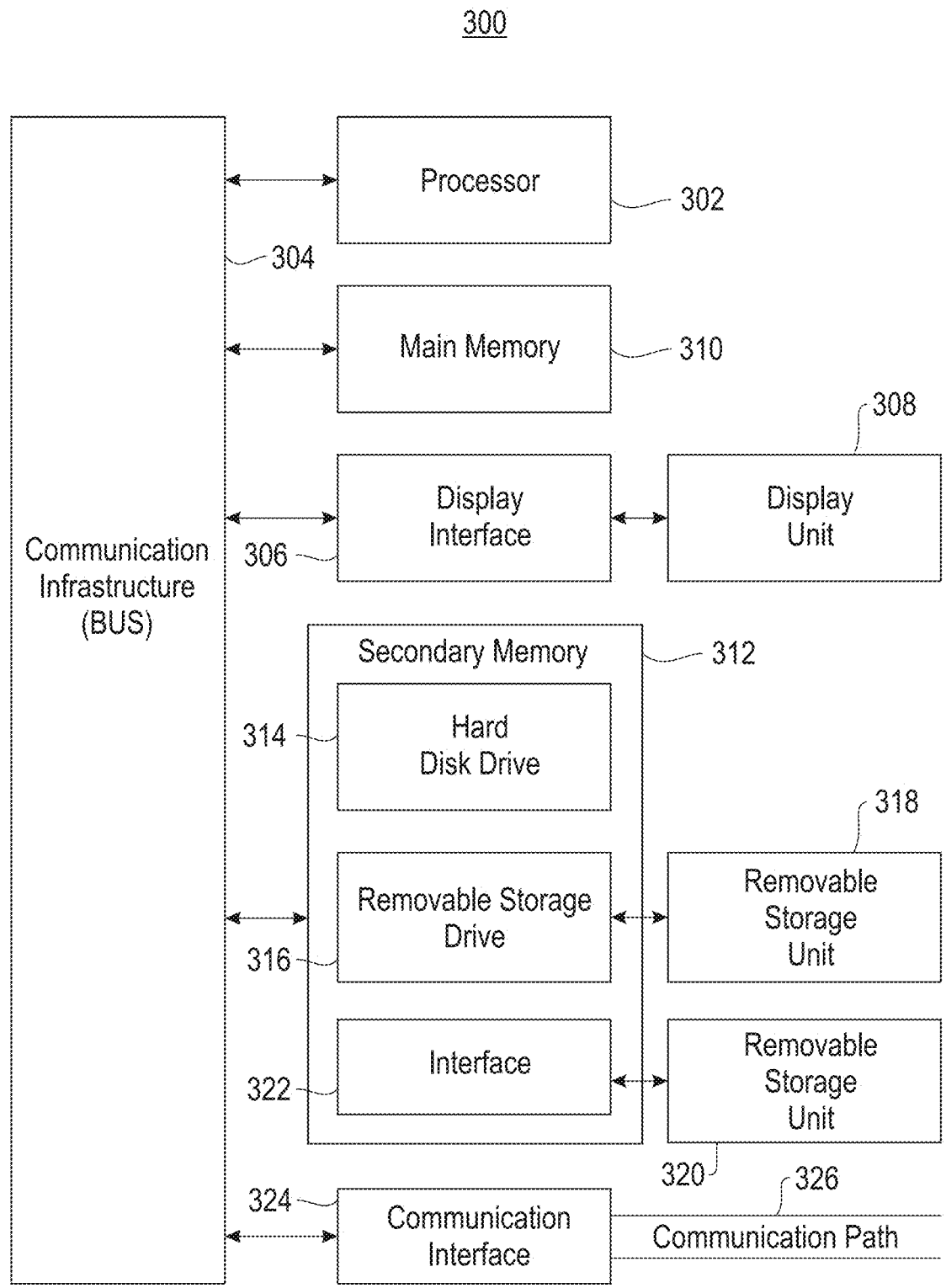
FIG. 6 is a high level block diagram showing an information processing system useful for implementing an embodiment of the present invention.

FIG. 6 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    changing a runtime of a distributed parallel batch-based dataflow processing environment to operate on multiple batches of object-oriented application objects, wherein the changed runtime provides that each processing thread uses its own vector of object-oriented application objects to process its own batches of object-oriented application objects, and each object is an instance of a class that is nested containing other classes;
    pre-allocating one or more vectors of object-oriented application objects for nested classes a single time, wherein the one or more vectors are extendible;
    assigning the one or more vectors of object-oriented application objects to a processing thread that processes an object-oriented application; and
    processing the multiple batches one at a time by the processing thread, wherein the one or more vectors of object-oriented application objects are re-used multiple times during processing of each new batch of object-oriented application objects by the processing thread;
    wherein a string is implemented as a complex object, the string is nested in an object using a serialized format in which all strings of a batch are concatenated together into a growable array, and the processing thread completes processing each batch before a next batch enters a pipeline of the processing thread.

2. The method of claim 1, wherein each object-oriented application object of each batch is a complex object with one or more levels of nesting and re-use of the one or more vectors of object-oriented application objects eliminates memory allocation and garbage collection in the distributed parallel dataflow batch-based processing environment.

3. The method of claim 2, further comprising:
    scanning a class hierarchy of the complex object to determine a set of vectors to allocate with one vector per class.

4. The method of claim 3, wherein the allocated set of vectors is used as a common location to place object-oriented application objects during processing of each of the multiple batches, and content at each level of nesting of the complex object is placed in a vector allocated for a corresponding class in the class hierarchy.

5. The method of claim 2, wherein the complex object further comprises at least one of a commonly used object-oriented application object type, or an array, and data structures are created for the complex object such that object-oriented application object reuse is enabled in the distributed parallel batch-based dataflow processing environment with the changed runtime.

6. The method of claim 1, wherein the one or more vectors of object-oriented application objects are extendible, and if a subsequent batch of object-oriented application objects has more content than will fit in a currently allocated size of a vector of object-oriented application objects, the size of the vector of object-oriented application objects is extended such that the vector of object-oriented application objects can hold content of the subsequent batch of object-oriented application objects.

7. The method of claim 2, wherein:
    the complex object is an instance of a polymorphic class having different distinct sub-types; and
    the method further comprises:
        for each distinct sub-type:
            pre-allocating a corresponding separate vector of object-oriented application objects; and
            processing, per sub-type, a batch of object-oriented application objects having the distinct sub-type independently using the corresponding vector of object-oriented application objects;
            combining processing results for each vector of object-oriented application objects pre-allocated for each distinct sub-type; and
        virtual function calls are reduced in presence of polymorphism.

8. A system comprising:
    at least one processor; and
    a non-transitory processor-readable memory device storing instructions that when executed by the at least one processor causes the at least one processor to perform operations including:
    changing a runtime of a distributed parallel batch-based dataflow processing environment to operate on multiple batches of object-oriented application objects, wherein the changed runtime provides that each processing thread uses its own vector of object-oriented application objects to process its own batches of object-oriented application objects, and each object is an instance of a class that is nested containing other classes;
    pre-allocating one or more vectors of object-oriented application objects for nested classes a single time;
    assigning the one or more vectors of object-oriented application objects to a processing thread that processes an object-oriented application; and
    processing the multiple batches one at a time by the processing thread, wherein the one or more vectors of object-oriented application objects are re-used multiple times during processing of each new batch of object-oriented application objects by the processing thread;
    wherein a string is implemented as a complex object, the string is nested in an object using a serialized format in which all strings of a batch are concatenated together into a growable array, and the processing thread completes processing each batch before a next batch enters a pipeline of the processing thread.

9. The system of claim 8, wherein each object-oriented application object of each batch is a complex object with one or more levels of nesting and re-use of the one or more vectors of object-oriented application objects eliminates memory allocation and garbage collection in the distributed parallel dataflow batch-based processing environment.

10. The system of claim 9, the operations further comprising:
scanning a class hierarchy of the complex object to determine a set of vectors to allocate with one vector per class.

11. The system of claim 10, wherein the allocated set of vectors is used as a common location to place object-oriented application objects during processing of each of the multiple batches, and content at each level of nesting of the complex object is placed in a vector allocated for a corresponding class in the class hierarchy.

12. The system of claim 9, wherein the complex object further comprises at least one of a commonly used object-oriented application object type, or an array, and data structures are created for the complex object such that object-oriented application object reuse is enabled in the distributed parallel batch-based dataflow processing environment with the changed runtime.

13. The system of claim 8, wherein the one or more vectors of object-oriented application objects are extendible, and if a subsequent batch of object-oriented application objects has more content than will fit in a currently allocated size of a vector of object-oriented application objects, a size of the vector of object-oriented application objects is extended such that the vector of object-oriented application objects can hold content of the subsequent batch of object-oriented application objects.

14. The system of claim 9, wherein:
the complex object is an instance of a polymorphic class having different distinct sub-types; and
the operations further comprise:
for each distinct sub-type:
pre-allocating a corresponding separate vector of object-oriented application objects; and
processing, per sub-type, a batch of object-oriented application objects having the distinct sub-type independently using the corresponding vector of object-oriented application objects;
combining processing results for each vector of object-oriented application objects pre-allocated for each distinct sub-type; and
virtual function calls are reduced in presence of polymorphism.

15. A computer program product comprising a computer-readable hardware storage medium having program code embodied therewith, the program code being executable by a computer to implement a method comprising:
changing a runtime of a distributed parallel batch-based dataflow processing environment to operate on multiple batches of object-oriented application objects, wherein the changed runtime provides that each processing thread uses its own vector of object-oriented application objects to process its own batches of object-oriented application objects, and each object is an instance of a class that is nested containing other classes;
pre-allocating one or more vectors of object-oriented application objects for nested classes a single time;
assigning the one or more vectors of object-oriented application objects to a processing thread that processes an object-oriented application; and
processing the multiple batches one at a time by the processing thread, wherein the one or more vectors of object-oriented application objects are re-used multiple times during processing of each new batch of object-oriented application objects by the processing thread;
wherein a string is implemented as a complex object, the string is nested in an object using a serialized format in which all strings of a batch are concatenated together into a growable array, and the processing thread completes processing each batch before a next batch enters a pipeline of the processing thread.

16. The computer program product of claim 15, wherein:
each object-oriented application object of each batch is a complex object with one or more levels of nesting and re-use of the one or more vectors of object-oriented application objects eliminates memory allocation and garbage collection in the distributed parallel dataflow batch-based processing environment;
the complex object further comprises at least one of a commonly used object-oriented application object type, or an array; and
data structures are created for the complex object such that object-oriented application object reuse is enabled in the distributed parallel batch-based dataflow processing environment with the changed runtime.

17. The computer program product of claim 16, the method further comprising:
scanning a class hierarchy of the complex object to determine a set of vectors to allocate with one vector per class.

18. The computer program product of claim 17, wherein the allocated set of vectors is used as a common location to place object-oriented application objects during processing of each of the multiple batches, and content at each level of nesting of the complex object is placed in a vector allocated for a corresponding class in the class hierarchy.

19. The computer program product of claim 15, wherein the one or more vectors of object-oriented application objects are extendible, and if a subsequent batch of object-oriented application objects has more content than will fit in a currently allocated size of a vector of object-oriented application objects, a size of the vector of object-oriented application objects is extended such that the vector of object-oriented application objects can hold content of the subsequent batch of object-oriented application objects.

20. The computer program product of claim 16, wherein:
the complex object is an instance of a polymorphic class having different distinct sub-types; and
the method further comprises:
for each distinct sub-type:
pre-allocating a corresponding separate vector of object-oriented application objects; and
processing, per sub-type, a batch of object-oriented application objects having the distinct sub-type independently using the corresponding vector of object-oriented application objects;
combining processing results for each vector of object-oriented application objects pre-allocated for each distinct sub-type; and
virtual function calls are reduced in presence of polymorphism.

* * * * *